United States Patent
Melzani

(10) Patent No.: US 9,875,377 B2
(45) Date of Patent: Jan. 23, 2018

(54) ENCRYPTION DEVICE OF A SUBSTITUTION-BOX TYPE, AND CORRESPONDING ENCRYPTION METHOD AND COMPUTER PROGRAM PRODUCT

(71) Applicant: STMicroelectronics S.r.l., Agrate Brianza (IT)

(72) Inventor: Filippo Melzani, Burago di Molgora (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 112 days.

(21) Appl. No.: 14/661,862

(22) Filed: Mar. 18, 2015

(65) Prior Publication Data

US 2015/0278554 A1    Oct. 1, 2015

(30) Foreign Application Priority Data

Mar. 31, 2014 (IT) ............... TO2014A0267
Mar. 31, 2014 (IT) ............... TO2014A0268

(51) Int. Cl.
*G06F 21/72* (2013.01)
*H04L 9/00* (2006.01)
*H04L 9/06* (2006.01)

(52) U.S. Cl.
CPC ............. *G06F 21/72* (2013.01); *H04L 9/002* (2013.01); *H04L 9/0631* (2013.01); *H04L 2209/046* (2013.01)

(58) Field of Classification Search
CPC .................. G06F 21/72; H04L 9/00
See application file for complete search history.

(56) References Cited

U.S. PATENT DOCUMENTS 7,895,253 B2 * 2/2011 Stein ............... G06F 7/726
                                                    708/492
8,677,306 B1 * 3/2014 Andreev ........... G06F 11/267
                                                    714/30
(Continued)

OTHER PUBLICATIONS

Regazzoni et al., "FPGA Implementations of the AES Masked Against Power Analysis Attacks", pp. 56-66, COSADE 2011—Second International Workshop on Constructive Side-Channel Analysis and Secure Design, 2011.*

(Continued)

*Primary Examiner* — Hadi Armouche
*Assistant Examiner* — Hee Song
(74) *Attorney, Agent, or Firm* — Seed IP Law Group LLP

(57) ABSTRACT

A device of the Substitution-Box (S-Box) type, which is suitable for operating in a symmetric-key encryption apparatus, in particular an AES (Advanced Encryption Standard) encryption apparatus, and includes at least one module configured for carrying out a non-linear operation in a finite field ($GF(2^8)$) of an encryption method implemented by the above encryption apparatus, the module including at least one reprogrammable look-up table to, for example, implement countermeasures against side-channel attacks. When no countermeasures are employed, the tables may be set to fixed values, instead of being reprogrammable. The above module includes a plurality of composite look-up tables that implement the non-linear operation in a composite field of finite subfields ($GF(2^4)^2$; $GF((2^2)^2)^2$) deriving from the finite field ($GF(2^8)$), each of the above composite look-up tables being smaller than a look-up table that is able to implement autonomously the non-linear operation in a finite field ($GF(2^8)$).

19 Claims, 10 Drawing Sheets

(56) References Cited

U.S. PATENT DOCUMENTS

| | | | | |
|---|---|---|---|---|
| 9,143,325 | B2* | 9/2015 | Chen | G06F 7/724 |
| 9,189,425 | B2* | 11/2015 | Farrugia | G09C 1/00 |
| 2003/0133568 | A1* | 7/2003 | Stein | H04L 9/0631 |
| | | | | 380/37 |
| 2005/0232430 | A1* | 10/2005 | Gebotys | H04L 9/003 |
| | | | | 380/286 |
| 2005/0283714 | A1* | 12/2005 | Korkishko | G06F 7/724 |
| | | | | 714/781 |
| 2006/0093136 | A1* | 5/2006 | Zhang | G06F 7/726 |
| | | | | 380/29 |
| 2006/0177052 | A1* | 8/2006 | Hubert | H04L 9/003 |
| | | | | 380/29 |
| 2008/0019524 | A1* | 1/2008 | Kim | H04L 9/0631 |
| | | | | 380/259 |
| 2008/0240422 | A1* | 10/2008 | Ozturk | H04L 9/0631 |
| | | | | 380/28 |
| 2008/0260145 | A1* | 10/2008 | Trichina | H04L 9/003 |
| | | | | 380/46 |
| 2010/0322412 | A1* | 12/2010 | Hung | G06F 7/726 |
| | | | | 380/28 |
| 2011/0013769 | A1* | 1/2011 | Itoh | H04L 9/003 |
| | | | | 380/28 |
| 2011/0055591 | A1 | 3/2011 | Rivain et al. | |
| 2012/0288085 | A1* | 11/2012 | Li | H04L 9/00 |
| | | | | 380/28 |
| 2015/0086007 | A1* | 3/2015 | Mathew | H04L 9/0631 |
| | | | | 380/28 |

OTHER PUBLICATIONS

"Announcing the Advanced Encryption Standard (AES)," Federal Information Processing Standards Publication 197, Nov. 26, 2001, 51 pages.

Satoh et al., "A Compact Rijndael Hardware Architecture with S-Box Optimization," in Advances in Cryptology—ASIACRYPT 2001, Boyd (ed.), Springer-Verlag Berlin Heidelberg, pp. 239-254, 2001.

Wong et al., "Composite Field $GF(((2^2)^2)^2)$ AES S-Box with Direct Computation in $GF(2^4)$ Inversion," $7^{th}$ International Conference on IT in Asia, 2011, 6 pages.

Roche et al., "Collision-Correlation Attack against Some $1^{st}$-Order Boolean Masking Schemes in the Context of Secure Devices," COSADE 2013, LNCS 7864: 114-136, 2013.

* cited by examiner

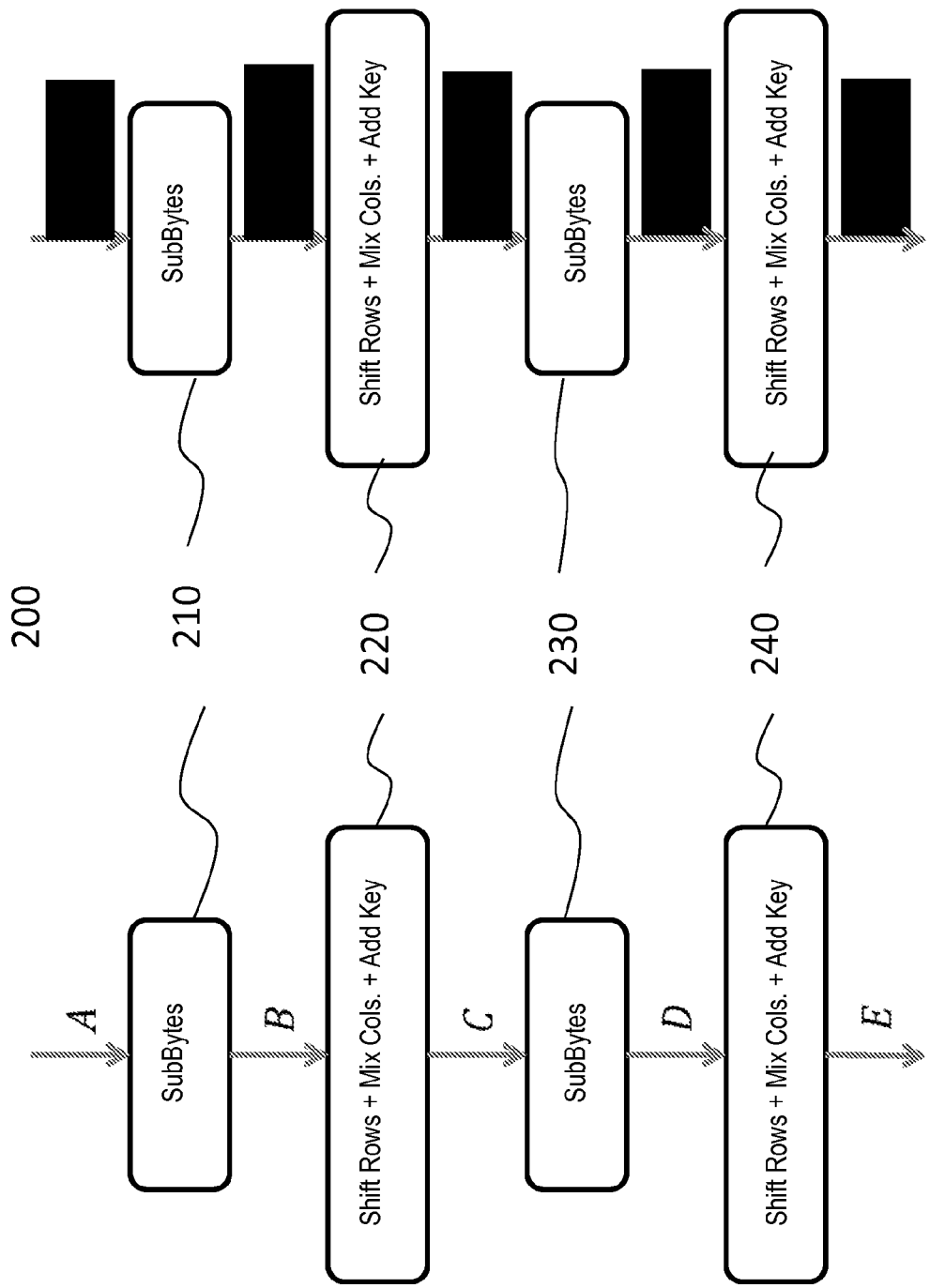

ENCRYPTION DEVICE OF A SUBSTITUTION-BOX TYPE, AND CORRESPONDING ENCRYPTION METHOD AND COMPUTER PROGRAM PRODUCT

BACKGROUND

Technical Field

The present description relates to a device of the Substitution-Box (S-Box) type, which is suitable for operating in a symmetric-key encryption apparatus.

Description of the Related Art

Look-up tables (LUTs), also referred to as association tables, are data structures that enable association to any admissible combination of input data of a corresponding (not necessarily unique) configuration of output data. Normally, the use of a look-up table makes it possible to speed up operations, in so far as access to the datum in the table is faster than calculation of the datum itself.

Look-up tables are hence frequently used in encryption algorithms, whether hardware or software, to carry out complex calculations. For example, a look-up table, the so-called "Substitution Box" or "Sbox," is used in many symmetric-key block algorithms, in particular in the known AES encryption algorithm for implementing operations such as, for example, the SubBytes operation.

In order to discover the key, in particular of symmetric-key block-encryption algorithms, such as the AES algorithm, it is known to use the so-called side-channel attacks, e.g., attacks that exploit the information that can be derived, through a so-called leakage process, e.g., a process of leakage of information, from physical implementation of the encryption procedure, for example by measuring the energy absorption of the circuit.

Several of the countermeasures against the above side-channel attacks exploit the presence of look-up tables in the circuits that implement the algorithms, performing operations of initialization of the values contained in these tables.

The way in which the look-up table is initialized may impact the effectiveness of protection against side-channel attacks, and it is difficult to obtain protection from high-order attacks. In general, a side-channel attack is defined as v-variant if it combines a number v of time instances, for example clock cycles, of the controlled physical manifestation, and is said to be of the d-th order if it requires statistical momenta of order d to be considered for distinguishing the correct hypotheses from the erroneous ones.

It is known, for example, to use as a countermeasure against side-channel attacks operations of linear, Boolean, masking of the data. According to this technique, each datum is masked via a Boolean XOR operation with mask values. It is convenient to incorporate also the mask values in the look-up table.

It is known in general to initialize a look-up table where there are input data din, e.g., the data that indicate the address or location of the values to be retrieved in the table, via a first input mask $R_1$ and to mask output data dout, e.g., the values retrieved at the address or location specified by the input data din, via a first output mask $R_2$. This is done by storing in the location of the look-up table corresponding to the address given by din$\oplus R_1$, e.g., by the XOR operation between the input data din and the first input mask $R_1$, a value given by dout$\oplus R_2$, e.g., by the XOR operation between the output data dout and the first output mask $R_2$. This is usually done one at a time for all the possible values of the input data din and performing the operation of storage in the look-up table of the corresponding output data.

The so-called high order side-channel attacks attack different points of the algorithm that use the same mask values so that the protection of the aforesaid mask can be removed. In general, given a mask, initialization of the look-up table with this mask and access to the masked data during computation means having at least two different operations in two different cycles that use one and the same mask, the corresponding attack thus qualifying as second-order attack.

In the above context, the countermeasures against high-order attacks are usually complex and are very penalizing in terms of latency time and circuit area required for their implementation. Moreover, in hardware implementations, the level of protection may need to be defined at the moment of design, because this affects the design itself and, as has been said, the area of the circuit to be designed. This constitutes a further complexity and drawback.

The foregoing is encountered in particular in AES encryption apparatuses, which, as has been said, implement S-Box devices in order to carry out operations, such as, for example, the SubBytes operation, that comprise at least one look-up table, in particular for carrying out the inversion required by the SubBytes operation.

The look-up table that implements the S-Box has a considerable size, and this determines a high latency, which limits the performance of the countermeasures against side-channel attacks.

BRIEF SUMMARY

In an embodiment, a Substitution-Box (S-Box), which is suitable for operating in a symmetric-key encryption apparatus, in particular an AES (Advanced Encryption Standard) encryption apparatus, and includes at least one module configured for carrying out a non-linear operation in a finite field of an encryption method implemented by said encryption apparatus, said module comprising at least one reprogrammable look-up table, said device being characterized in that said module comprises a plurality of composite look-up tables that implement said non-linear operation in a composite field of finite subfields deriving from said finite field, each of said composite look-up tables being smaller than a look-up table that is able to implement autonomously said non-linear operation in a finite field. In an embodiment, one or more of said tables of composite look-up tables are reprogrammable and obtained through programmable memory means. In an embodiment, said look-up composite tables are implemented via flip-flop structures, in particular registers. In an embodiment, said non-linear operation is an operation of multiplicative inversion of a SubBytes operation of an AES encryption procedure, and in that said device comprises a module for performing an affine transformation. In an embodiment, said encryption apparatus is comprised in a set-top box and/or in a smart card. In an embodiment, said composite field of finite subfields is obtained via a procedure comprising the operations of: mapping all the elements of the finite field of the non-linear operation by decomposing them over the composite field of finite subfields, using an isomorphism; computing the non-linear operation to be implemented, in the composite field of finite subfields; and mapping the results of said operation of computation over the field of the non-linear operation, applying the inverse of the isomorphism used for the decomposition over the composite field of finite subfields. In an embodiment, given the decomposition over the composite field of finite subfields, at least part of the linear operations are implemented, in particular the additions, resulting from said decomposition via combinational logic and the remaining operations, including the non-linear operations, resulting from said decomposition are implemented via said composite look-up tables.

In an embodiment, a symmetric-key encryption method comprises carrying out a non-linear operation in a finite field and providing an apparatus comprising a Substitution-Box (S-Box) device for carrying out said non-linear operation, said S-Box device comprising a plurality of composite look-up tables that implement said non-linear operation in a composite field of finite subfields. In an embodiment, one or more of said look-up tables are accessed via access operations that include an operation of initialization of the look-up table, which comprises writing initialization values (dout) in said look-up table, by applying an input mask to input data (din; $din_{ref}$, $din_{mask}$) that identify a location of said look-up table and an output mask to data (dout; $dout_{ref}$, $dout_{mask}$) at output from a location of said look-up table. In an embodiment, at least one initialization of said look-up table is carried out, which comprises: providing at least one second input mask and one second output mask; and computing corresponding initialization values as a function of a logic combination of said first input mask and second input mask and of a logic combination of said first output mask and second output mask. In an embodiment, said logic combination is an operation of exclusive OR (XOR) between the values of said first input mask and said second input mask and, respectively, between the values of a logic combination of said first output mask and said second output mask. In an embodiment, the method comprises repeating the step of computation for a given number of times, supplying each time a further input mask and a further output mask, and computing said logic combinations as a function of said further input mask or output mask and of the input mask or output mask supplied previously. In an embodiment, said given number of times is chosen at run-time, for regulating the performance or level of protection of the encryption method in regard to side-channel attacks. In an embodiment, initialization is completed in one clock cycle. In an embodiment, a computer program product comprises portions of software code that are suitable for implementing the steps of an embodiment of a method as disclosed herein.

In an embodiment, a device comprises: AES (Advanced Encryption Standard) circuitry, including: non-linear operation circuitry configured to carry out a non-linear operation in a finite field of an AES process, said non-linear operation circuitry comprising a plurality of programmable registers configured to implement a plurality of composite look-up tables to perform said non-linear operation in a composite field of finite subfields deriving from said finite field; and linear operation circuitry configured to perform at least one linear operation of the AES process. In an embodiment, each of said composite look-up tables has a size smaller than a size of a corresponding single look-up table to perform said non-linear operation in the finite field. In an embodiment, said non-linear operation is an operation of multiplicative inversion of a SubBytes operation of an AES encryption procedure. In an embodiment, the device comprises at least one of: set-top box circuitry; and smart card circuitry. In an embodiment, said AES circuitry is configured to: map elements of the finite field of the non-linear operation by decomposing the elements over the composite field of finite subfields using an isomorphism; compute the non-linear operation in the composite field of finite subfields; and map results of said computation over the field of the non-linear operation, applying the inverse of the isomorphism used for the decomposition over the composite field of finite subfields. In an embodiment, the AES circuitry comprises combinational logic and is configured to: implement additions resulting from the decomposition using the combinational logic; and implement remaining non-linear operations, resulting from said decomposition, using said composite look-up tables. In an embodiment, the AES circuitry is configured to initialize a composite look-up table of the plurality of composite look-up tables by: applying a first address-mask to an unmasked address, generating a masked address; and applying a first data-mask to unmasked data, generating masked data. In an embodiment, the AES circuitry is configured to reinitialize the composite look-up table by: applying a logical combination of the first address-mask and a second address-mask to the masked address, generating an address corresponding to application of the second address-mask to the unmasked address; and applying a logical combination of the first data-mask and a second data-mask to the masked data, generating data corresponding to application of the second data-mask to the unmasked data.

In an embodiment, a method comprises: performing a non-linear operation of an Advanced Encryption Standard (AES) process in a finite field of the AES process using a plurality of programmable registers to implement a plurality of composite look-up tables to perform said non-linear operation in a composite field of finite subfields deriving from said finite field; and performing a linear operation circuitry of the AES process. In an embodiment, each of said composite look-up tables has a size smaller than a size of a corresponding single look-up table to perform said non-linear operation in the finite field. In an embodiment, said non-linear operation is an operation of multiplicative inversion of a SubBytes operation of an AES encryption procedure. In an embodiment, the method comprises at least one of: controlling a set-top box based on a result of the AES process; and controlling operation of a smart card based on the result of the AES process. In an embodiment, the method comprises: mapping elements of the finite field of the non-linear operation by decomposing the elements over the composite field of finite subfields using an isomorphism; computing the non-linear operation in the composite field of finite subfields; and mapping results of said computation over the field of the non-linear operation, applying the inverse of the isomorphism used for the decomposition over the composite field of finite subfields. In an embodiment, the method comprises: implementing additions resulting from the decomposition using combinational logic; and implementing remaining non-linear operations, resulting from said decomposition, using said composite look-up tables. In an embodiment, the method comprises initializing a composite look-up table of the plurality of composite look-up tables, the initializing including: applying a first address-mask to an unmasked address, generating a masked address; and applying a first data-mask to unmasked data, generating masked data. In an embodiment, the initializing includes: applying a logical combination of the first address-mask and a second address-mask to the masked address, generating an address corresponding to application of the second address-mask to the unmasked address; and applying a logical combination of the first data-mask and a second data-mask to the masked data, generating data corresponding to application of the second data-mask to the unmasked data.

In an embodiment, a non-transitory computer-readable medium's contents configure a processing device to perform a method, the method comprising: performing a non-linear operation of an Advanced Encryption Standard (AES) process in a finite field of the AES process using a plurality of programmable registers to implement a plurality of composite look-up tables to perform said non-linear operation in a composite field of finite subfields deriving from said finite field; and performing a linear operation circuitry of the AES process. In an embodiment, the processing device is at least one of: a set-top box; and a smart card. In an embodiment, the method comprises: mapping elements of the finite field of the non-linear operation by decomposing the elements over the composite field of finite subfields using an isomorphism; computing the non-linear operation in the composite field of finite subfields; and mapping results of said computation over the field of the non-linear operation, applying the inverse of the isomorphism used for the decomposition over the composite field of finite subfields.

In an embodiment, a system comprises: an interface configured to receive and output data; and S-Box circuitry, including: non-linear operation circuitry configured to carry out a non-linear operation in a finite field of an Advanced Encryption Standard (AES) process, said non-linear operation circuitry comprising a plurality of programmable registers configured to implement a plurality of composite look-up tables to perform said non-linear operation in a composite field of finite subfields deriving from said finite field; and linear operation circuitry configured to perform at least one linear operation of the AES process. In an embodiment, the system comprises at least one of: set-top box control circuitry configured to couple to the interface; and smart card control circuitry configured to couple to the interface. In an embodiment, the S-Box circuitry is configured to initialize a composite look-up table of the plurality of composite look-up tables by: applying a first address-mask to an unmasked address, generating a masked address; and applying a first data-mask to unmasked data, generating masked data. In an embodiment, the S-Box circuitry is configured to reinitialize the composite look-up table by: applying a logical combination of the first address-mask and a second address-mask to the masked address, generating an address corresponding to application of the second address-mask to the unmasked address; and applying a logical combination of the first data-mask and a second data-mask to the masked data, generating data corresponding to application of the second data-mask to the unmasked data.

Various embodiments may envisage use of embodiments in S-Box devices for AES encryption. Various embodiments may envisage that the above S-Box uses a look-up-table structure with tower-of-field architecture. Various embodiments may envisage that the above S-Box uses a look-up-table structure implemented via flip-flops to enable fast execution. Various embodiments may envisage that the above S-Box executes, in a single clock cycle, steps of masking of the aforesaid look-up tables.

Various embodiments may refer also to an encryption method as likewise to a computer program product that can be loaded into the memory of at least one computer (e.g., a terminal in a network) and comprises portions of software code suitable for carrying out the steps of an embodiment of a method when the program is run on at least one computer. As used herein, the aforesaid computer program product is understood as being equivalent to a computer-readable medium containing instructions for control of the computer system so as to co-ordinate execution of a method according to an embodiment. Reference to "at least one computer" is meant to highlight the possibility of implementation in a modular and/or distributed form.

BRIEF DESCRIPTION OF THE SEVERAL VIEWS OF THE DRAWINGS

Various embodiments will now be described, purely by way of example, with reference to the annexed figures, wherein:

FIGS. 2a and 2b show blocks diagrams illustrating application of an embodiment of a method to AES encryption;

DETAILED DESCRIPTION

Figures 1A, 1B:
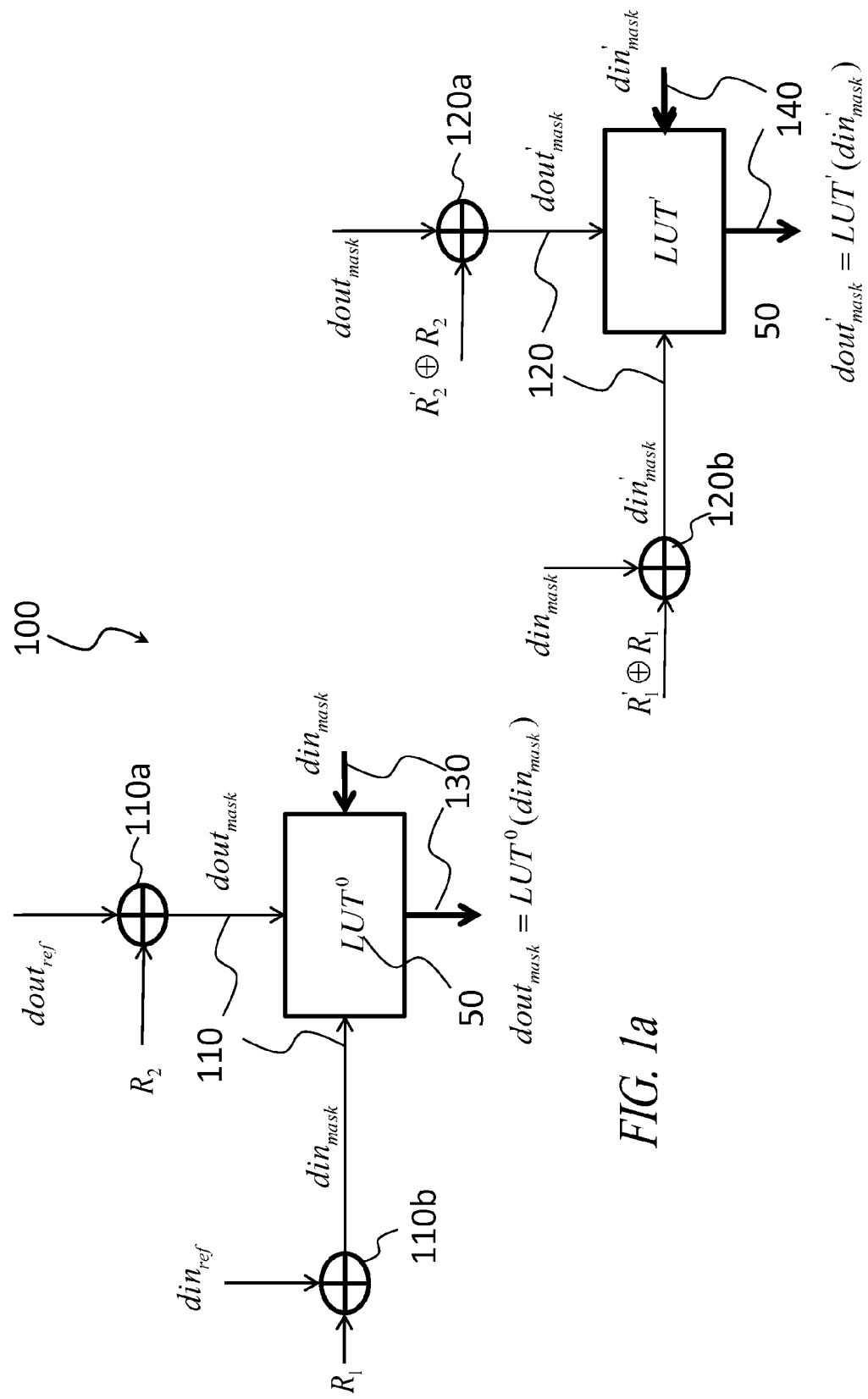
FIGS. 1a and 1b show blocks diagrams illustrating an embodiment of a method.

In the ensuing description, numerous specific details are provided in order to facilitate as much as possible understanding of the embodiments provided by way of example. The embodiments may be implemented with or without specific details, or else with other methods, components, materials, etc. In other cases, structures, materials, or operations that are well known are not shown or described in detail so that aspects of the embodiments will not be obscured. Reference in the framework of the present description to "an embodiment" or "one embodiment" means that a given peculiarity, structure, or characteristic described in connection with the embodiment is comprised in at least one embodiment. Hence, recurrence of phrases such as "in an embodiment" or "in one embodiment" in various points of the present description does not necessarily refer to one and the same embodiment. Moreover, the peculiarities, structures, or characteristics may be combined in any convenient way in one or more embodiments.

The notations and references are here provided only for convenience of the reader and do not define the scope or the meaning of the embodiments.

An embodiment envisages in general a device of a Substitution-Box (S-Box) type suitable for operating in a symmetric-key block-encryption apparatus, such as an AES (Advanced Encryption Standard) encryption apparatus, which comprises a module configured for carrying out a non-linear operation in a finite field of an encryption method, such as the inversion of the SubBytes operation in the AES finite field, implemented by the encryption apparatus, for example the apparatus of a set-top box, where the aforesaid module comprises a plurality of composite look-up tables that implement the above non-linear operation in a composite field that derives from the finite field, each of the composite look-up tables being smaller than a single look-up table that is to implement autonomously the non-linear operation in a finite field, for example smaller than the look-up table conventionally used for carrying out inversion of the SubBytes operation.

There now follows a preliminary description of an embodiment in context of operation of an embodiment of S-Box device, in which it is envisaged to carry out an encryption procedure, which, for defense against side-channel attacks, adopts a strategy of initialization of the look-up table via masking. This context, envisages carrying out an operation of initialization of the look-up table by masking via a first input mask the data at input to the look-up table and with a first output mask the data at output from the look-up table. It is then envisaged to re-initialize the look-up table via the steps of providing a second input mask and a second output mask, and computing the values of re-initialization of the look-up table as a function of a logic combination of the values of the first and second input masks and of a logic combination of the values of the first and second output masks. The above initialization operations may be carried out on one or more of the composite look-up tables of the S-Box device according to an embodiment, which will be described in greater detail in what follows with reference to FIGS. 4-9.

With reference to FIGS. 1a and 1b, there is hence now described in greater detail the above operating context, which envisages a protection from side-channel attacks that comprises an initialization procedure 100, which envisages writing initialization values in the look-up table, applying at least two successive initialization steps, 110 and 120.

With reference to FIG. 1a, represented therein is the step of initialization 110 of a look-up table 50, for example the look-up table of an S-Box for implementing AES encryption. The reference 110 designates the initialization operations, e.g., the operations of writing in the look-up table 50.

In the framework of the above initialization operation 110, first-initialization output data $dout_{ref}$ are sent at input to the look-up table 50, where they are combined, in an XOR block 110a, with the first data or output mask $R_2$, in order to produce masked output data $dout_{mask}$.

These masked output data $dout_{mask}$ are written in the look-up table 50 at a masked input datum, or, address, $din_{mask}$, which is in turn obtained from a first-initialization address $din_{ref}$ combined in an XOR block 110b with the first address or input mask $R_1$.

The masked output data $dout_{mask}=dout_{ref}\oplus R_2$ are written in the look-up table 50 at the masked addresses $din_{mask}=din_{ref}\oplus R_1$ (according to the formula $$dout_{mask}=F(din_{mask}\oplus R_1)\oplus R_2 \quad (1)$$

where F is a generic function F(x) implemented via the look-up table 50; in the case provided by way of example, F(x) may correspond to S-Box(x), more specifically to one of the suboperations that constitute the inversion, for example the inversion in $GF(2^4)$. If the look-up table 50 were not subject to masking, its content would simply correspond to the function F(x) applied to the inputs. We denote in what follows by $LUT^0$ the function implemented by the masked look-up table, which supplies the masked output data $dout_{mask}$.

Figure 9A:
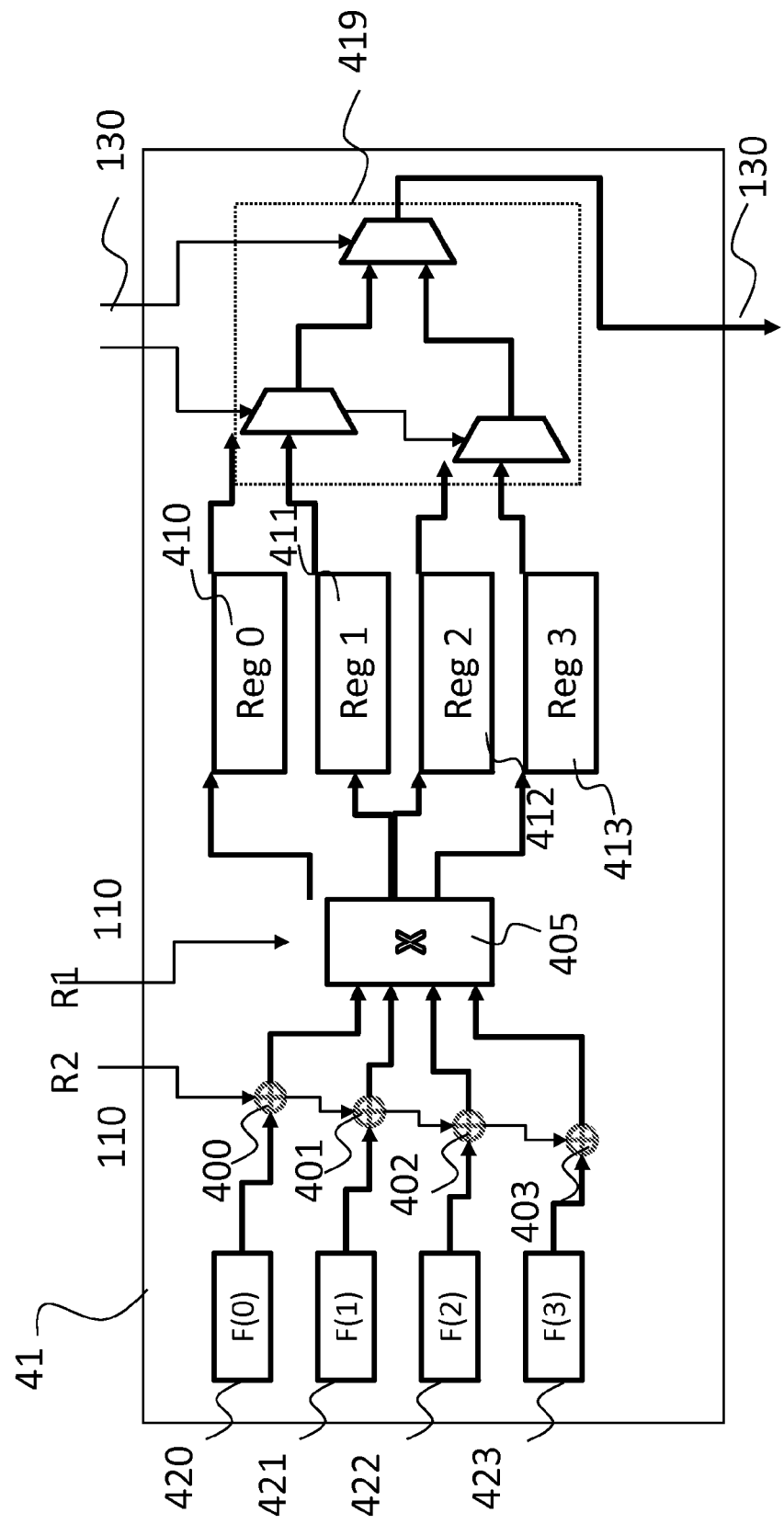
FIG. 9a shows a circuit implementation of an element of the device according to the known art.

The first-initialization output data $dout_{ref}$ and the first-initialization addresses $din_{ref}$ are plaintext data that may usually come from a reference table that implements the function F (see also in this regard blocks 420-423 in FIG. 9a, described in the sequel of the present disclosure).

The reference 130 designates, instead, an operation of reading of the data; by accessing the look-up table 50 with the masked address $din_{mask}$, it returns the output $$dout_{mask}=LUT^0(din_{mask}) \quad (2)$$

FIG. 1b shows, instead, an operation of sequential initialization 120, or re-initialization, that is carried out after the first initialization 110. It is, in fact, envisaged to define a second input mask $R'_1$, and a second output mask $R'_2$, and to evaluate a combination of input masks $\Delta_1$ as XOR operation between the first input mask $R_1$ and the second input mask $R'_1$, $\Delta_1=R'_1\oplus R_1$, as well as to evaluate a combination of output masks $\Delta_2$ as XOR operation between the first output mask $R_2$ and the second output mask $R'_2$, $\Delta_2=R'_2\oplus R_2$ according to the formula $$dout'_{mask}=LUT^0(din'_{mask}\oplus(R'_1\oplus R_1))\oplus(R'_2\oplus R_2) \quad (3)$$

Consequently, once the initialization step 110 has been carried out, instead of repeating the same step 110 and simply using the new, or second, input and output masks $R'_1$ and $R'_2$ for generating a new masked look-up table, the new content LUT' table 50 is generated starting from the previous version according to step 120, e.g., the content $LUT^0$ deriving from the operation 110, reading in the aforesaid content $LUT^0$ of the previous look-up table for each of the possible addresses that can be generated $din_{mask}=din_{ref}\oplus R_1$ the corresponding value stored, which, for what has been said, is $dout_{mask}=dout_{ref}\oplus R_2$. Starting from the masked input datum $din_{mask}=din_{ref}\oplus R_1$, a new masked input datum $din'_{mask}=din_{mask}\oplus\Delta_1$ is generated, where $\Delta_1=R'_1\oplus R_1$. It should be noted how, if all the terms are rendered explicit, the new masked input datum $din'_{mask}=din_{mask}\oplus\Delta_1$ will involve cancelling out of the contribution of the first, or past, input mask $R_1$, there remaining only the contribution of the second, or new, input mask $R'_1$, so that $din'_{mask}=din_{ref}\oplus R'_1$.

Likewise, starting from the masked output datum $dout_{mask}=dout_{ref}\oplus R_2$, a new masked output datum $dout'_{mask}=dout_{mask}\oplus\Delta_2$ is obtained, where $\Delta_2=R'_2\oplus R_2$, with a corresponding cancelling out of the contribution of the first, or past, output mask $R_2$, there remaining just the contribution of the second, or new, output mask $R'_2$, so that $dout'_{mask}=dout_{ref}\oplus R'_2$.

The new masked output datum $dout'_{mask}$ is stored as new content LUT' of the look-up table 50 at the address corresponding to the new masked input datum, or address, $din'_{mask}$. This new content LUT' of the look-up table 50 is based only upon the content of the second, or new, masks, namely, the input mask $R'_1$ and the output mask $R'_2$, as follows:

$$dout'_{mask}=F(din'_{mask}\oplus(R'_{mask}\oplus(R'_1))\oplus(R'_2) \quad (4)$$

Consequently, at output from the look-up table 50, we obtain in a reading operation 140, for a given address specified by input data $din'_{mask}$ $$dout'_{mask}=LUT'(din'_{mask}) \quad (5)$$

In this way, it may be appreciated how the side-channel of each initialization operation provided by step 120 will be linked to the combination of masks $\Delta_1=R'_1\oplus R_1$ rather than to the second input mask $R'_1$ alone, whereas the datum is masked by the second input mask $R'_1$ alone. The same applies to the output datum and the mask $R'_2$. A high-order attack would thus require three elements: the data masked by the second input mask $R'_1$', the operation of initialization that involves the combination of masks $\Delta_1=R'_1\oplus R_1$, and at least some other operation that involves the first input mask $R_1$ alone.

The procedure has been described, with reference to FIGS. 1a and 1b, only as regards a first initialization 110 and a re-initialization 120, but it is clear that it can be extended iteratively, using more than two masks.

For example, it is possible to carry out an initialization at step 110 with the first input mask $R_1$, a second initialization at step 120 with a combination of the first mask $R_1$ and of the second mask $R'_1$, $R'_1\oplus R_1$, a third initialization at step 120 with a combination of the second mask $R'_1$ and of a third mask $R''_1$, $R''_1\oplus R'_1$, a fourth initialization at step 120 with a combination of the third mask $R''_1$ and of a fourth mask $R'''_1$, $R'''_1\oplus R''_1$. The look-up table would then be used for calculations on masked data via the fourth mask $R'''_1$. A side-channel attack would in this case require operating on the latter fourth-initialization operation, as well as on all the previous initializations, from the first to the third.

It should be noted that in general the method, also in the embodiment described with reference to FIGS. 1a and 1b, may be considered as comprising iteration of an initialization step in which the first masks $R_1$ and $R_2$ are set to zero, e.g., the case where the table at start is not masked.

The method envisages in general choosing the given number of steps of iteration, e.g., the number of times of execution, of the operation 120 of initialization at the moment of run-time, without requiring any further hardware in an embodiment, simply applying a criterion of trade-off between performance and level of protection.

There now follows a more detailed description of an embodiment of an implementation of the method of FIGS. 1a and 1b within an AES encryption procedure.

FIG. 2a shows an implementation 200 of the AES encryption procedure. The steps represented constitute some of the steps for encryption of a 16-byte block, known as AES state. This procedure 200, as likewise the details of the operations 210, 220, 230, 240 are known to a person skilled in the sector. See, e.g., NIST, Announcing the Advanced Encryption Standard, Federal Information Processing Standards Publication 197 (Nov. 26, 2001).

The AES state to be encrypted, designated by A, is subjected to a first SubBytes operation 210, supplying at output a state B, which is subjected to a set 220 of operations ShiftRows+MixColumns+AddKey, to generate a state C. The operations 210, 220 correspond to a first round. Then, in a next round, a second SubBytes operation 230 is carried out, to obtain a state D, as well as a further set 240 of operations ShiftRows+MixColumns+AddKey, to generate a state E. There is carried out a number of rounds envisaged by the procedure 200 according to the number of corresponding round subkeys to be added. The various modes of handling of the AES rounds are in any case in themselves known to a person skilled in the sector.

As has been said, the SubBytes operation 210 or 230, which contains a non-linear portion, as will be described in greater detail in what follows, is carried out with the aid of a Substitution Box, or S-Box, which comprises a look-up table.

FIG. 2a describes one of the possible (unprotected) implementations of AES. FIG. 2b refers of the same implementation with the introduction of the countermeasure against side-channel attacks.

Prior to start of the AES encryption procedure 200 an initial setting of the S-Box is envisaged that serves as base for initialization via the combinations of masks Δ, of the type carried out in step 110 described previously. The masks according to the method are hence applied to the plaintext (e.g., the initial unencrypted AES state).

During execution of a round, the S-Box (or S-Boxes where a plurality of them is present) is set with the real masks that have been applied to the AES state via the combinations of masks Δ (initialization 120), and the computation envisaged in steps 210 and 220 is then carried out. This is performed at each round.

At the end of the AES encryption procedure 200, the masked S-Boxes are released by carrying out an operation that is the reverse of that of the initial setup, and the masks are removed from the ciphertext that is the product of the AES encryption procedure 200.

During the AES encryption procedure 200, the SubBytes operation at step 210 or 230 is calculated by itself; hence, the look-up table of the S-Box is initialized just before each use so that the table will incorporate the masks applied to the datum that is to be processed, which in general may differ from one datum to another.

It is possible to carry out a number of initializations of the look-up table of the S-Box between two consecutive uses in order to separate the masks associated thereto.

This increases protection against side-channel attacks, given that the possibility of leakage towards a side channel depends upon the sequence of combinations of masks Δ.

These operations of multiple initializations are carried out also during initial setup and at the end of the procedure for final release of the ciphertext. As for the sequence of multiple initializations, the initial setup envisages applying in sequence combinations of masks Δ to the plaintext in such a way as to obtain, upon completion of this step, the AES state protected by just one real mask, e.g., a mask effectively stored in the system unlike the combinations of masks, without this mask having ever been used. Likewise, at the end of the procedure, the real mask is removed from the ciphertext using only combinations of masks Δ, and never directly the real mask.

In order to prevent leakage due to the single masks, just the combinations of masks Δ are generated and passed on for processing, just the combinations of masks Δ are stored in registers, and just the combinations of masks Δ are used for initialization of the look-up table or tables.

FIG. 2b shows the masks applied by the method with reference to the same encryption procedure 200 as that of FIG. 2a.

For input to the S-Box (1-byte input of 16-byte AES states), input masks L are provided for masking in the first round (steps 210-220), and the input masks N are provided for masking in the second round (steps 230-240). Output masks M are provided for masking in the first round (steps 210-220), and output masks O are provided for masking in the second round (steps 230-240).

In this regard, it is possible to consider re-employing the masks to minimize their number using, for example, the following criterion: a distance of two rounds between two values associated to one and the same mask.

Figure 3:
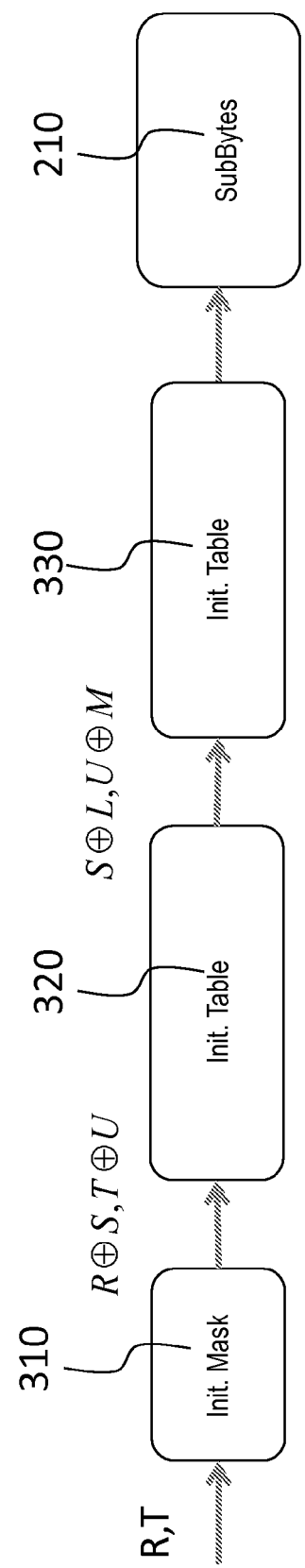
FIG. 3 shows a block diagram illustrating details corresponding to application of an embodiment of FIG. 2b.

FIG. 3 shows the masks, of 1 byte each, for initialization of each S-Box prior to the procedure 200. The size of the masks in this step depends upon how many S-Boxes are present. Hence, with 16 S-Boxes there will be 16 bytes for each mask, but with just one S-Box there will be 1 byte for each mask. Input masks R, S are used for the initial setup and final release, and output masks T, U are used for the initial setup and final release.

As shown in FIG. 3, in a step 310 initialization of the input and of the output with the setup masks R (input mask) and T (output mask) is carried out. Next, in a step 320 an initialization of the table is carried out via the combination of the setup mask R (input mask) with the mask S (input mask). The same is performed on the output using the setup masks T and U. Next, a further initialization step 330 is carried out with the input mask L and the output mask M, shown with reference to FIG. 2B, by combining them with the setup masks S and U. The operation 210 of the first round, in which the data are masked by the masks L and M, is then performed.

Hence, with reference to what is shown in FIG. 3, as regards the first two rounds of the AES encryption algorithm in the example in which there is envisaged re-use of the masks every two rounds, the following 16-byte values are generated and stored, which are then also used for initialization of the S-Boxes:

$\alpha = M \oplus O$
$\beta = U \oplus M$
$\gamma = T \oplus U$
$\delta = T$
$\epsilon = R \oplus S$
$\zeta = R$ As may be noted, except for the initial masks R and T, only combinations of two logic values are generated and stored. For example, in an embodiment the logic value of the mask M that protects the AES state is never generated alone, is never stored alone, and is never used alone to initialize the S-Boxes. This facilitates ensuring that the side-channel information produced by handling of the values listed above will never be associated to a single mask, but to combinations of masks, which also contribute to the need to gather various points to carry out an attack.

In order to maintain consistency between the masks applied to the data during the linear part of the algorithm, indicated by blocks 220 and 240 in FIG. 2, further values can be calculated starting from the ones introduced previously, as follows:

$\eta = S \oplus L = MixCols(\alpha \oplus \beta) \oplus [\epsilon \oplus MixCols(\gamma)] \oplus [\zeta \oplus MixCols(\delta)]$
$\theta = L \oplus N = MixCols(\alpha)$ where:
L=MixCols(O)
N=MixCols(M)

As may be noted, the values to be derived for use of the masks in the linear part of the algorithm are also calculated starting from combinations of two or more logic values, given that the operations to be performed are linear. This ensures that also the side-channel information produced by computation of these values will not be associated to a single mask, but to combinations of masks.

From what has been described so far, it emerges clearly how the method envisages carrying out frequent initializations of the look-up tables.

The time of latency involved in an operation of initialization depends upon the size of the look-up table and limits both the performance and the efficiency of the countermeasures against side-channel attacks.

In hardware implementations, for requirements linked to the area of the circuits, the look-up tables are usually implemented via a reprogrammable memory such as, for example, a RAM. The RAM must be filled for initialization by entering one datum at a time, as has been mentioned, entering all the possible input values and storing the respective output values at the corresponding addresses. Hence, it emerges clearly how the latency required depends upon the size of the look-up table (for example, 256 input data for the AES S-Box).

Whenever the mask changes, the look-up table must be initialized with that mask.

Known countermeasures envisage:

initializing the look-up table before each operation as completely new masks and hence paying the price of all the latencies associated to these operations; or reusing the same masks for different operations and data, rendering, however, the process more vulnerable to high-order side-channel attacks.

In implementations that present constraints, for example, of area or of memory size available, a single look-up table may be shared between all the bytes of the data, rendering even more evident the disadvantage deriving from initialization.

In the light of the initialization operations, in particular in the context of the masking procedure described, the countermeasures against multi-variate high-order attacks may use a look-up table that facilitates:

initialization of the entire table in a single cycle, generating all the data to be entered and storing them in the same cycle; it should be noted that it is also possible to carry out implementations that operate on a greater number of cycles; the example itself described herein can be used on a number of cycles if the latency due to the initialization operations is accepted; and initialization via the combination of masks Δ; in this way, the leakage that may possibly be analyzed for a side-channel attack is correlated to the combination of masks A instead of to the masks proper.

Consequently, to meet the need of balancing performance and efficiency in carrying out the initialization operations, in particular the operations of the method described above, which involves repeated initialization operations, according to an embodiment an S-Box device is here proposed that has a specific structure of look-up table, in particular the look-up table that implements the function required for the AES S-Box.

In an embodiment, a device is proposed comprising a look-up table, wherein said look-up table is divided into smaller look-up tables, referred to as "composite look-up tables", in particular applying the so-called "tower of fields" architecture. The modes of implementation of this architecture with respect to the AES S-Box are in themselves known, in so far as it is known to use the tower-of-fields architecture for reducing the area occupation of the AES S-Box when it is implemented using pure combinational logic.

Via the operation of division of the look-up table into smaller tables, it becomes possible to replace the RAM normally used as reprogrammable memory with flip-flop memory structures, in particular structures that define memory registers. This thus facilitates writing all the registers in a single clock cycle and consequently carry out initialization of the entire look-up table, in particular of the entire S-Box, in a single clock cycle.

Moreover, as will be described in what follows, implementation of the operations in subfields by the look-up tables facilitates freedom of regulation of the tables in order to improve the properties thereof for an effective protection against side-channel attacks.

In this way, advantageously, the countermeasures against side-channel attacks may have a lower impact on the performance of the encryption system, whereas the countermeasures against high-order attacks of the method illustrated in FIGS. 1*a*, 1*b* are, instead, possible also in devices that present a limitation in regard to the area available.

In general, with the device comprising look-up tables, the designer has a greater freedom in devising implementation of the tables, in so far as they are no longer linked to the structure of the RAM cell, and a greater freedom in defining the scheme of the countermeasure, in so far as the disadvantage deriving from execution of the initialization operations is removed.

An embodiment of the device comprising look-up tables proposed herein can moreover be exploited also for countermeasures in regard to so-called "fault attacks", e.g., attacks with injection of faults.

There now follows a more detailed description of the device comprising an S-Box according to an embodiment.

It is envisaged to implement the S-Box isolating the non-linear part of the multiplicative inversion in the finite field, and performing it via finite subfields.

The S-Box device, which normally operates on the specific Galois field $GF(2^8)$ described in the FIPS197 standard, is implemented via decomposition into smaller finite fields, $GF(2^4)^2$ and $GF((2^2)^2)^2$.

More precisely, the above operation of composition envisages:

a) mapping all the elements of the Galois field $GF(2^8)$ over the composite field using an isomorphism;

b) computing the multiplying inverse in the composite field; and c) mapping the results of the above computation over the Galois field $GF(2^8)$, using the inverse of the isomorphism used for decomposition.

As has been said, the procedure of decomposition into smaller finite fields is in itself known and for any detail the reader is referred, for example, to the paper by Satoh et al. "A Compact Rijndael Hardware Architecture with S-Box Optimization," ASIACRYPT 2001, LNCS 2248, sect. 4.1-4.3, pp. 245-248 (2001). In particular, for the steps a) and c), by way of example, it is possible to use the isomorphism described on page 248, Eq. 13, and for step b) Eqs. 9, 10, 11 on page 247.

It is envisaged to implement this approach in an extended way to the look-up tables, in particular reprogrammable look-up tables, in order to maintain the hardware compact.

In particular, in an embodiment, it is envisaged to replace the single 256×8 look-up table used in the S-Box with a plurality of smaller reprogrammable look-up tables.

Figure 4:
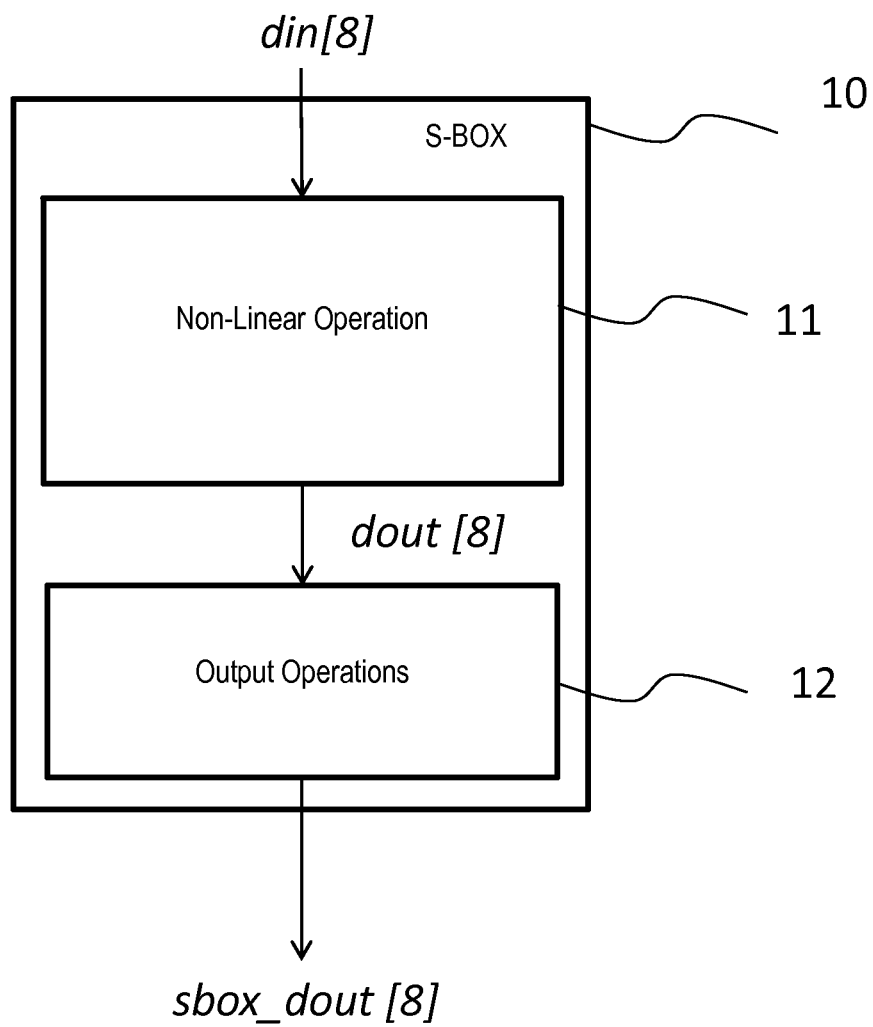
FIG. 4 shows a known block diagram of an S-Box device.

As shown in FIG. 4, an S-Box 10 presents to the input data din[8], which specify an 8-bit address, two computation modules, a module 11 for performing a non-linear operation, in particular inversion of the SubBytes operation, and a module 12 for performing a linear operation, specifically the affine transformation of the SubBytes operation. This module 11 is the main reason why the implementation of the S-Box device comprises at least one look-up table. The module 11 for performing a non-linear operation supplies its own output data dout[8], with the result of the inversion, to the module 12 for performing a linear operation, specifically the affine transformation of the SubBytes operation. The module 12 supplies at output the output data of the S-Box $sbox_{13}$ dout[8], e.g., the input data din[8] on which the SubBytes operation has been carried out. In the above module 12 it is possible to maintain the additive masking, as is applies in a known way in the KeyAddition and MixColumns operations.

An embodiment is applied in particular in a look-up table in the module 11 for implementing the inversion.

Figure 5:
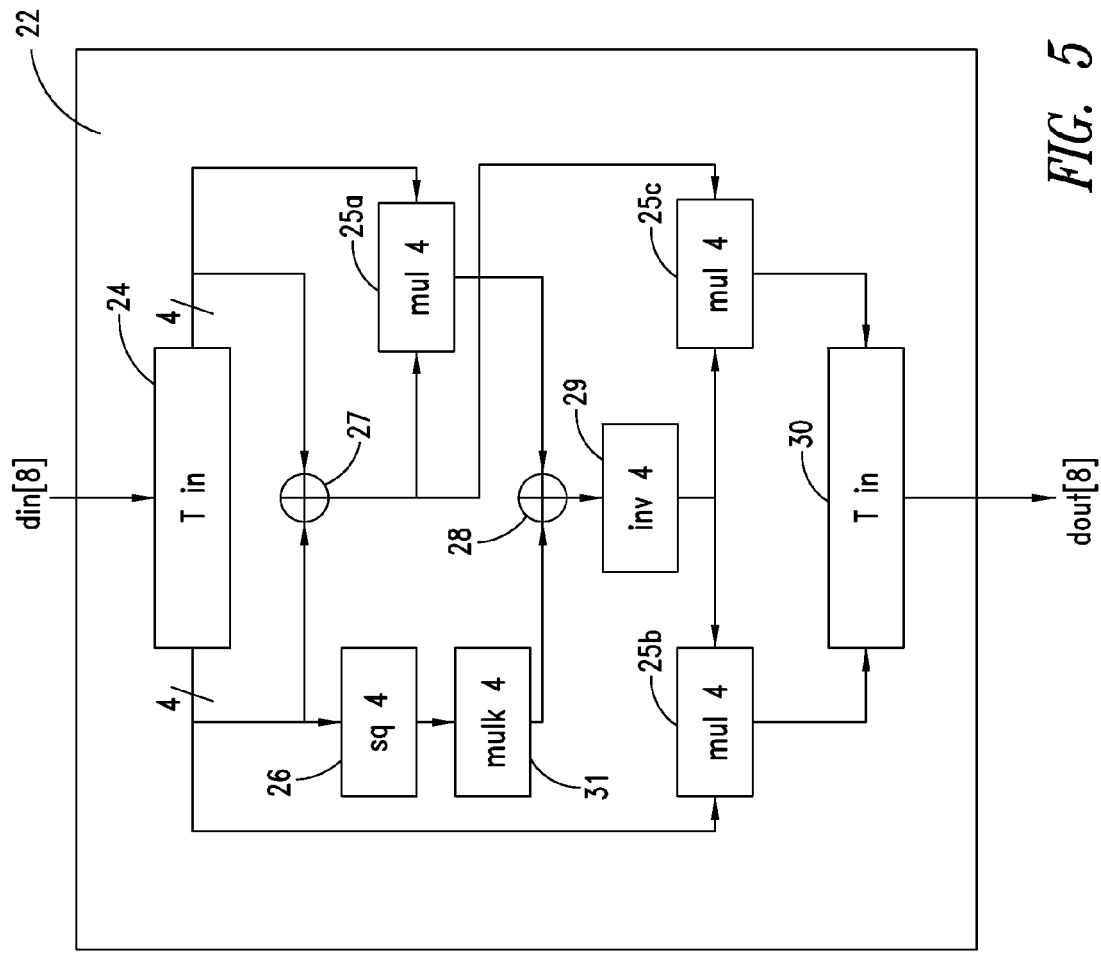
FIG. 5 shows composing the non-linear part of the device of FIG. 4.

FIG. 4 represents the scheme for the direct S-Box function alone, used for AES encryption. In the case of decryption, the inverse function is necessary, called $Sbox^{-1}$. As shown in the paper by Satoh et al. referred to previously, it is possible to re-use the same inversion of block 11 for both functions by adding a further block for the inverse function of the affine transformation. This solution is represented in FIG. 5 on page 246 of the paper cited. It is thus clear that what is described for block 11 enables implementation of both the direct function and the inverse function of the SubBytes operation.

For a better understanding, described in detail in FIG. 5 is an implementation 22, which already presents a decomposition in $GF(2^4)$ of the function of inversion of the SubBytes operation, which normally operates, instead, on the Galois field $GF(2^8)$. The input data din[8] are supplied to a transformation block 24 that implements the isomorphism that maps the elements of the 8-bit field $GF(2^8)$, into elements of the subfields $GF(2^4)$ by dividing the input into 4-bit blocks.

This type of implementation is in itself known (see, for example, the aforementioned paper by Satoh et al., FIG. 6) and comprises three 4-bit multipliers 25a, 25b, 25c that carry out the function MUL4 in the field $GF(2^4)$, a squaring block 26, a block for multiplication by a constant 31 (corresponding to one of the polynomials chosen for the decomposition into subfields), a first XOR block 27, a second XOR block 28 for the sum of elements of the field, and a look-up table 29 for the inversion INV4. Upstream of the output is a transformation block 30 that recomposes the 8-bit datum to form the output data dout[8], implementing the inverse isomorphism of block 24. Operation of this circuit, as has been said, is in itself known.

It should be noted that in this known implementation there is a single look-up table 29 that operates on 4-bit data, whereas the rest of the modules is implemented via combinational logic.

Figure 6:
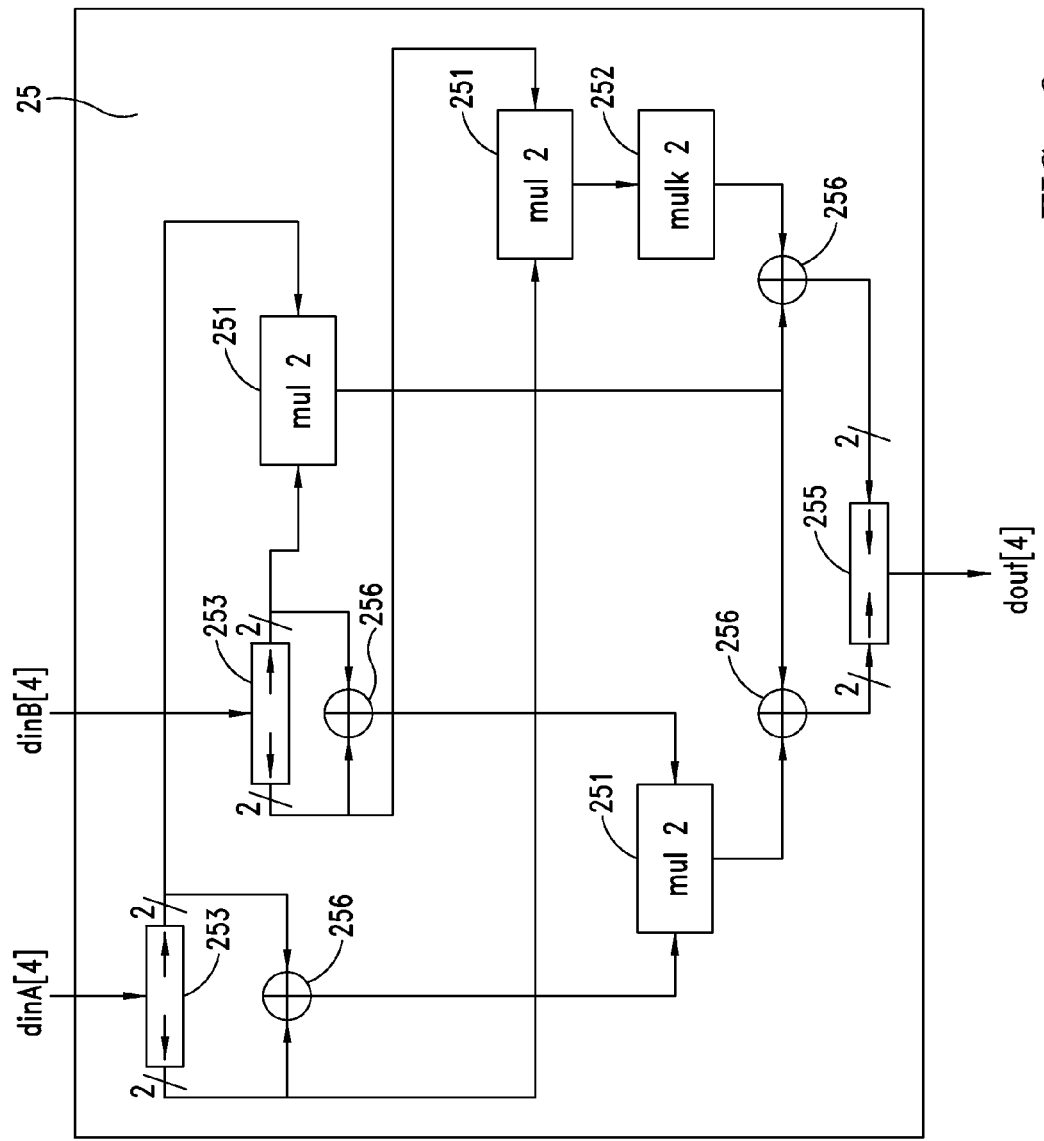
FIG. 6 shows a block diagram illustrating details of blocks of the device of FIG. 5.

Each block represented in FIG. 5 can be in turn decomposed into subfields and hence into blocks that operate on elements of smaller size. FIG. 6 shows in detail, to facilitate understanding, one of the multiplication modules MUL4 25, which in turn, in a known way, is implemented via three multipliers, three 2-bit multipliers 251, and one multiplier for multiplication by a constant 252. This multiplication module MUL4 25 also comprises at input two transformation blocks 253 for dividing the two pairs of 4-bit input data dinA[4] and dinB[4], a transformation block 255 for recomposing the 4-bit output data dout[4], and XOR modules 256 for carrying out the additions.

It should be noted that the fact that the multiplier 25 has a pair of 4-bit input data, dinA[4] and dinB[4], renders not convenient implementation thereof via a LUT because it is cumbersome, thus annulling the benefits of the tower-of-fields decomposition.

In an embodiment, it is envisaged to implement the function of inversion for the module 11 of the S-Box device by exploiting the fact that the algebraic structure enables decomposition of the function. The criteria listed below are followed:

implementing the linear operations via combinational logic;

implementing the non-linear operations via look-up tables; and dividing the above look-up tables until they have a sufficiently small size; by way of example, for the multiplications it is preferable to use $GF((2^2)^2)^2$, because, as has been said, it would not be convenient to have the module MUL4 25 implemented as a look-up table; for the inversion it is possible to choose whether to stop at $GF(2^4)$ or also in this case use $GF((2^2)^2)^2$.

Each of the look-up tables that implement non-linear operations may be masked by a respective pair of, input and output, masks.

In general, the original LUT is made up of 256×8=2048 bits. By appropriately decomposing the blocks with the tower-of-fields method, a number of look-up tables are obtained, which, however, are smaller. For example, the inversion in $GF(2^4)$ is made up of 16×4=64 bits. Or else, each of the operations MUL2 in $GF((2^2)^2)^2$ is made up of 16×2=32 bits. Since in the example described all the LUTs as a whole require a fraction of the memory bits required for the entire LUT of the S-Box, they can be implemented, and in an embodiment are implemented, using flip-flops.

In this way, the initialization of the entire look-up table can be obtained in a single clock cycle given that all the data can be entered in parallel in one and the same clock cycle. Likewise, all the LUTs can be initialized in parallel.

Figure 7:
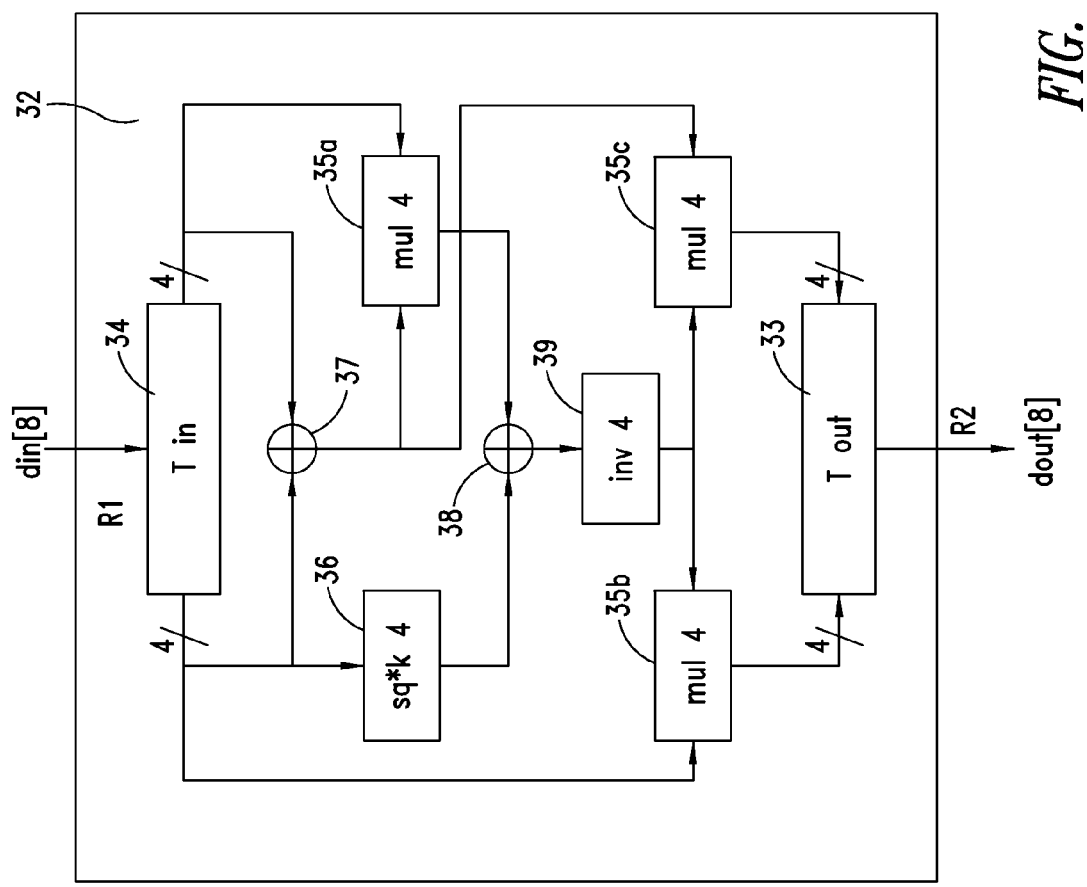
FIG. 7 shows a block diagram of a device according to an embodiment.
Figure 8:
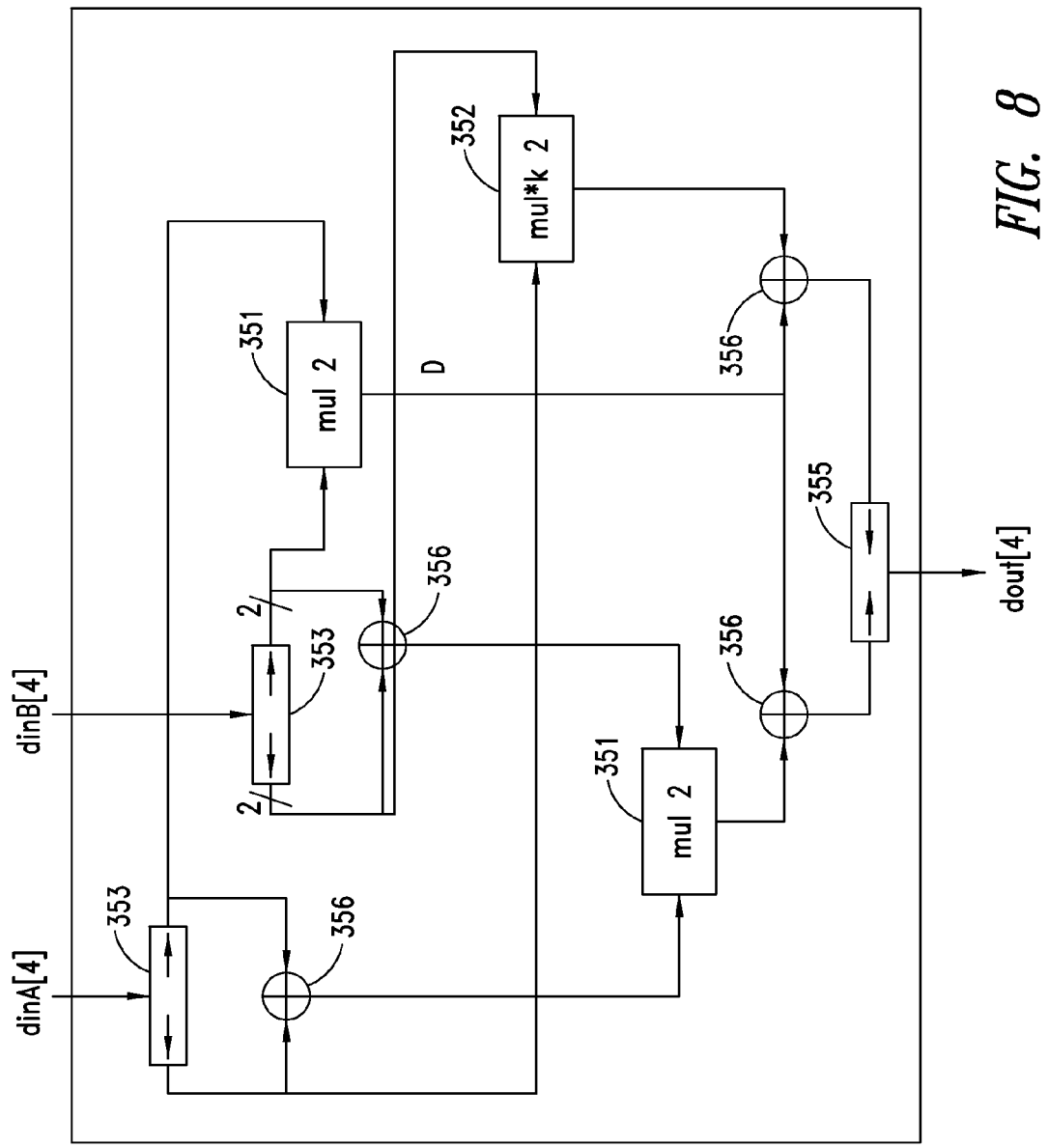
FIG. 8 shows a block diagram illustrating details of blocks of an embodiment of the device of FIG. 7.

FIG. 7 hence describes in detail an implementation 32 of the inversion module of the S-Box according to an embodiment. Unlike the implementation 22 of FIG. 5, the squaring with multiplication by a constant (condensed in a single block 36), the inversion INV4 39, in addition to the blocks forming the three 4-bit multipliers 35a, 35b, 35c are obtained through look-up tables that incorporate input and output masks. A transformation block 33 that recomposes the data is provided upstream of the output.

In particular, in the above module 32, 8-bit masks are provided for the input data din [8] and the output data dout[8]. Within the module 32, additional 4-bit masks are present for the outputs of the squaring block 36, of the look-up table 39 for the inversion INV4, and of one of the multipliers 35. Moreover, since, as is shown in FIG. 7, the multiplier MUL4 35 is in turn implemented in a way similar to the multiplier 25, but also in this case condensing in a single block 352 a multiplication with the multiplication by a constant and implementing both this block 352 and the multipliers 351 as look-up tables, three additional 2-bit masks are also provided.

Hence, as a whole, the circuit of FIG. 7 uses 34 independent bits for the mask. Even though the function of multiplication is the same, in practice it is possible to consider that there are different look-up tables, because they will have different masks. Each of the three multipliers MUL4 is made up of three look-up tables. The implementation described in FIG. 7 shows a 4-bit inversion in block 39, but it is clear that also this block, in variant embodiments, may be decomposed into 2-bit inversion blocks.

It should be noted that the decomposition with use of look-up tables enables decomposition of the original function, e.g., the S-Box, not necessarily having to use only operations defined over the fields, such as for example multiplication, squaring, and inversion. Even though the known tower-of-fields decompositions are always based on the above few operations, the solution proposed via the use of look-up tables enables definition and use of functions that do not have any relation with the above classic operations, or else condensation of a number of operations in one and the same look-up table (as is the case described for blocks 25, 35, which carry out squaring with multiplication by a constant), an operation that is problematical to implement with the combinational logic and hence is rarely used. Moreover, since the decomposition of the S-Box described herein is functional for protection from side-channel attacks, the LUTs can be designed according to this purpose and not for the known use of reducing the area, for example by implementing a decomposition that will maintain redundant operations, which are less efficient from the standpoint of area occupation, but can produce benefits as regards protection against side-channel attacks.

Figure 9B:
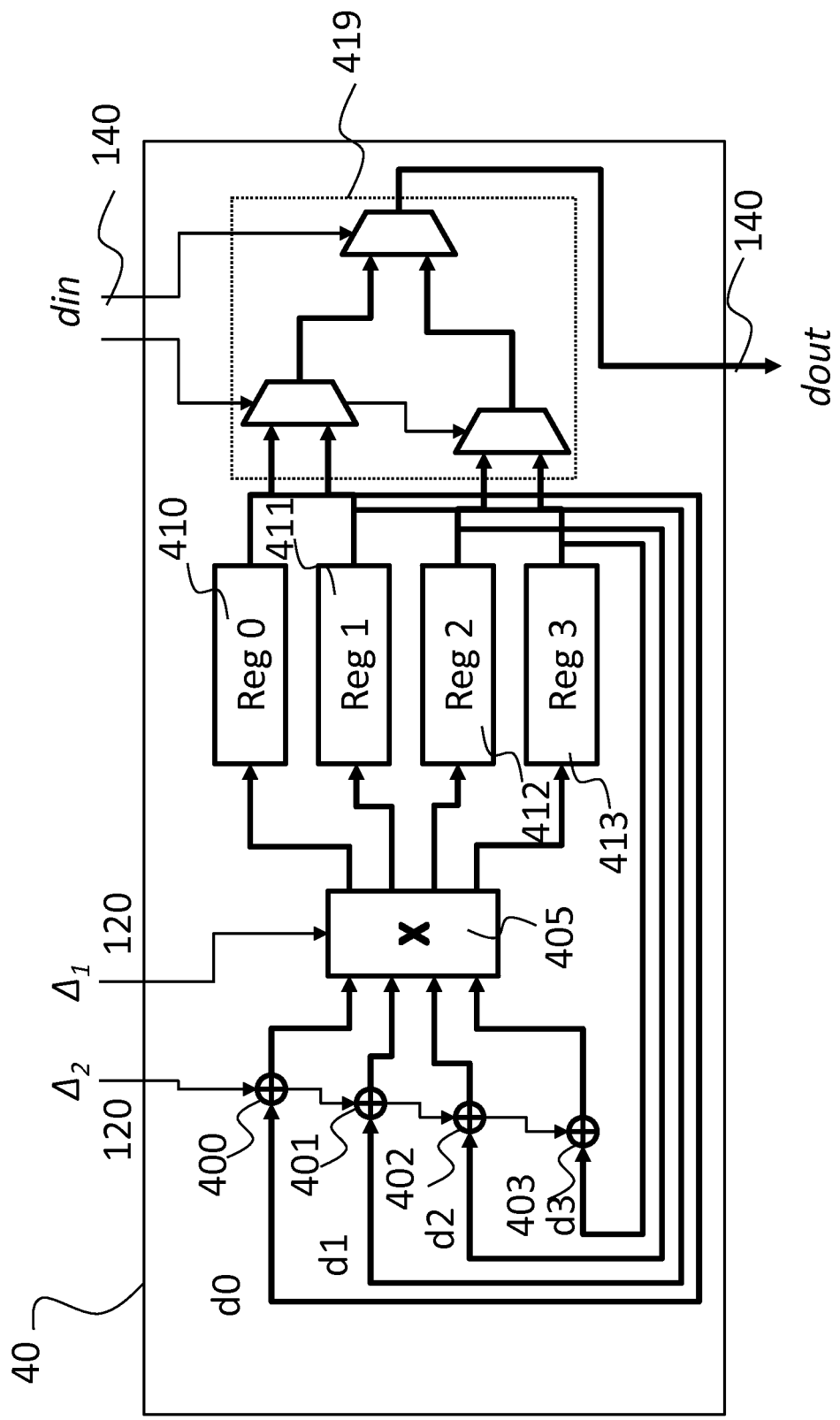
FIG. 9b shows a circuit implementation of an element of the device according to an embodiment.

FIG. 9b shows an implementation of a look-up table 40 according to an embodiment, which operates on 2-bit data at input and 2-bit data at output. In general, the size in bits of the input data may differ from the size in bits of the output data. The scheme of this table 40 may be used for building, for example, the table 351 of FIG. 8 and implementing the multiplication function, but may moreover be used for implementing any LUT used within the S-Box proposed. In this table 40 the method described with reference, for example, to FIGS. 1a and 1b may be moreover used.

Designated by 410-413 are registers that operate as memory cells for the data contained in the LUT, which are designated, respectively, by d0, . . . , d3. Each of these data d0, . . . , d3 are sent from the output of the respective register 410-413 in parallel to a block 419 for selection of the output datum dout and to a respective XOR module 400-403, which carries out thereon the logic XOR with the logic combination of output masks $\Delta_2$. Next, an interconnection matrix 405, provided with a number of multiplexers, under the control of the logic combination of input masks $\Delta_1$, carries out masking, storing the outputs of the XOR modules 400-403 in the registers 410-413 in the order indicated by the logic combination of input masks $\Delta_1$.

The selection block 419 is a set of multiplexers, which, in a way of in itself known, under the control of the input datum din, which contains the address of the data in the LUT, selects the appropriate output of the registers 410-413, supplying it as output datum dout, thus implementing the reading operation 140 of FIG. 1b.

FIG. 9a shows by way of comparison the implementation with flip-flops of a look-up table 41 for generic use, e.g., not specifically in an S-Box, according to the known art that uses a masking method similar to the operation 110 alone described with reference to FIG. 1a. Reference numbers that are the same as the ones used in FIG. 9b identify similar components. As may be noted, the XOR modules 400-403 receive at input the first output mask $R_2$ and directly the reference initialization values F(0), . . . , F(3), which may be non-modifiable pre-set values, e.g., hardwired, or, as in the example described, may be contained in specific registers 420-423, storing the outputs of the XOR modules 400-403 in the registers 410-413 in the order indicated by the first input mask $R_1$. Advantageously, instead, the table 40 of FIG. 9b sends to the XOR modules 400-403 the logic combinations of output masks $\Delta_2$ and the data d0, . . . , d3 from the output of the respective register 410-413, storing the outputs of the XOR modules 400-403 in the registers 410-413 in the order indicated by the logic combination of input masks $\Delta_1$.

The device comprising look-up tables according to an embodiment, via a decomposition of the table of the S-Box device of the AES encryption into smaller tables over finite subfields, implements the above tables via flip-flop structures, which can be updated in a single clock cycle.

The encryption method described, which comprises maskings using single masks and also combinations of masks, implemented in an apparatus that comprises the S-Box device according to an embodiment can be executed in a fast way, enabling a repeated and flexible use of the steps of initialization according to an embodiment, which renders the AES encryption procedure even more impervious to side-channel attacks even of high order. The encryption method according to an embodiment, via operations of initialization based upon combinations of masks, means that the possible correlations obtained by the side-channel attacks are always linked to the above combinations, but not to the values of the individual masks that originate them.

In this way, the countermeasures against side-channel attacks can have a lower impact on the performance of the encryption system, whereas, instead, it is possible to implement the countermeasures against high-order attacks according to the method of an embodiment also in devices that present limitation in regard to the area available.

The device according to an embodiment implements encryption procedures that are applied in general on data stored in data media and in particular on data stored in data media of any apparatus that implements an AES encryption system, for example in set-top boxes or smartcards. This AES encryption system can be regarded as a peripheral within a System-on-Chip, which is not used as stand-alone component, but is integrated in a chip of a smartcard or a chip of a set-top box or even chips of other applications that require AES encryption.

In general, the above apparatus comprises or is associated to data-processing means and, in particular, comprises one or more processors.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
AES (Advanced Encryption Standard) circuitry, including:
non-linear operation circuitry configured to carry out a non-linear operation in a finite field of an AES process, said non-linear operation circuitry comprising a plurality of programmable registers configured to implement a plurality of composite look-up tables to perform said non-linear operation in a composite field of finite subfields deriving from said finite field, wherein the plurality of composite look-up tables are reprogrammable; and
linear operation circuitry configured to perform at least one linear operation of the AES process, wherein
each of said composite look-up tables has a size smaller than a size of a corresponding single look-up table to perform said non-linear operation in the finite field; and
said AES circuitry is configured to:
map elements of the finite field of the non-linear operation by decomposing the elements over the composite field of finite subfields using an isomorphism;
compute the non-linear operation in the composite field of finite subfields; and
map results of said computation over the field of the non-linear operation applying the inverse of the isomorphism used for the decomposition over the composite field of finite subfields.

2. The device of claim 1 wherein said non-linear operation is an operation of multiplicative inversion of a SubBytes operation of an AES encryption procedure.

3. The device of claim 1, comprising at least one of:
set-top box circuitry; and
smart card circuitry.

4. The device of claim 1 wherein the AES circuitry comprises combinational logic and is configured to:
implement additions resulting from the decomposition using the combinational logic; and
implement remaining non-linear operations, resulting from said decomposition, using said composite look-up tables.

5. The device of claim 1 wherein the AES circuitry is configured to initialize a composite look-up table of the plurality of composite look-up tables by:
applying a first address-mask to an unmasked address, generating a masked address; and
applying a first data-mask to unmasked data, generating masked data.

6. The device of claim 5 wherein the AES circuitry is configured to reinitialize the composite look-up table by:
applying a logical combination of the first address-mask and a second address-mask to the masked address, generating an address corresponding to application of the second address-mask to the unmasked address; and
applying a logical combination of the first data-mask and a second data-mask to the masked data, generating data corresponding to application of the second data-mask to the unmasked data.

7. The device of claim 1 wherein the plurality of composite look-up tables comprise a plurality of flip-flops.

8. A method, comprising:
performing a non-linear operation of an Advanced Encryption Standard (AES) process in a finite field of the AES process using a plurality of programmable registers to implement a plurality of composite look-up tables to perform said non-linear operation in a composite field of finite subfields deriving from said finite field, wherein the plurality of programmable registers are reprogrammable; and
performing a linear operation circuitry of the AES process, wherein
each of said composite look-up tables has a size smaller than a size of a corresponding single look-up table to perform said non-linear operation in the finite field; and
the method includes:
mapping elements of the finite field of the non-linear operation by decomposing the elements over the composite field of finite subfields using an isomorphism;
computing the non-linear operation in the composite field of finite subfields; and
mapping results of said computation over the field of the non-linear operation, applying the inverse of the isomorphism used for the decomposition over the composite field of finite subfields.

9. The method of claim 8 wherein said non-linear operation is an operation of multiplicative inversion of a SubBytes operation of an AES encryption procedure.

10. The method of claim 8, comprising at least one of:
controlling a set-top box based on a result of the AES process; and
controlling operation of a smart card based on the result of the AES process.

11. The method of claim 8, comprising:
implementing additions resulting from the decomposition using combinational logic; and
implementing remaining non-linear operations, resulting from said decomposition, using said composite look-up tables.

12. The method of claim 8, comprising initializing a composite look-up table of the plurality of composite look-up tables, the initializing including:
applying a first address-mask to an unmasked address, generating a masked address; and
applying a first data-mask to unmasked data, generating masked data.

13. The method of claim 12 wherein the initializing includes:
applying a logical combination of the first address-mask and a second address-mask to the masked address, generating an address corresponding to application of the second address-mask to the unmasked address; and
applying a logical combination of the first data-mask and a second data-mask to the masked data, generating data corresponding to application of the second data-mask to the unmasked data.

14. A non-transitory computer-readable medium having contents which configure a processing device to perform a method, the method comprising:
performing a non-linear operation of an Advanced Encryption Standard (AES) process in a finite field of the AES process using a plurality of programmable registers to implement a plurality of composite look-up tables to perform said non-linear operation in a composite field of finite subfields deriving from said finite field, wherein the plurality of programmable registers are reprogrammable; and
performing a linear operation circuitry of the AES process, wherein
each of said composite look-up tables has a size smaller than a size of a corresponding single look-up table to perform said non-linear operation in the finite field; and the method includes:
mapping elements of the finite field of the non-linear operation by decomposing the elements over the composite field of finite subfields using an isomorphism;
computing the non-linear operation in the composite field of finite subfields; and
mapping results of said computation over the field of the non-linear operation, applying the inverse of the isomorphism used for the decomposition over the composite field of finite subfields.

15. The medium of claim 14 wherein the processing device is at least one of:
a set-top box; and
a smart card.

16. A system, comprising:
an interface configured to receive and output data; and
S-Box circuitry, including:
non-linear operation circuitry configured to carry out a non-linear operation in a finite field of an Advanced Encryption Standard (AES) process, said non-linear operation circuitry comprising a plurality of programmable registers configured to implement a plurality of composite look-up tables to perform said non-linear operation in a composite field of finite subfields deriving from said finite field, wherein the plurality of programmable registers are reprogrammable; and
linear operation circuitry configured to perform at least one linear operation of the AES process, wherein
each of said composite look-up tables has a size smaller than a size of a corresponding single look-up table to perform said non-linear operation in the finite field; and
said S-Box circuitry is configured to:
map elements of the finite field of the non-linear operation by decomposing the elements over the composite field of finite subfields using an isomorphism;
compute the non-linear operation in the composite field of finite subfields; and
map results of said computation over the field of the non-linear operation, applying the inverse of the isomorphism used for the decomposition over the composite field of finite subfields.

17. The system of claim 16, comprising at least one of:
set-top box control circuitry configured to couple to the interface; and
smart card control circuitry configured to couple to the interface.

18. The system of claim 16 wherein the S-Box circuitry is configured to initialize a composite look-up table of the plurality of composite look-up tables by:
applying a first address-mask to an unmasked address, generating a masked address; and
applying a first data-mask to unmasked data, generating masked data.

19. The system of claim 18 wherein the S-Box circuitry is configured to reinitialize the composite look-up table by:
applying a logical combination of the first address-mask and a second address-mask to the masked address, generating an address corresponding to application of the second address-mask to the unmasked address; and
applying a logical combination of the first data-mask and a second data-mask to the masked data, generating data corresponding to application of the second data-mask to the unmasked data.

* * * * *